US008274390B2

(12) United States Patent
Blake et al.

(10) Patent No.: US 8,274,390 B2
(45) Date of Patent: Sep. 25, 2012

(54) RADIO FREQUENCY IDENTIFICATION ANTENNA SWITCHING IN A CONVEYOR SYSTEM

(75) Inventors: Robert E. Blake, Woodbury Heights, NJ (US); Robert W. Perry, Sicklerville, NJ (US); Charles A. Naylor, Sewell, NJ (US); Anthony R. Gargano, legal representative, Sewell, NJ (US); Steven D. Essinger, Philadelphia, PA (US)

(73) Assignee: Metrologic Instruments, Inc., Blackwood, NJ (US)

( * ) Notice: Subject to any disclaimer, the term of this patent is extended or adjusted under 35 U.S.C. 154(b) by 1609 days.

(21) Appl. No.: 11/602,454

(22) Filed: Nov. 20, 2006

(65) Prior Publication Data

US 2012/0218081 A1 Aug. 30, 2012

(51) Int. Cl.
*G08B 13/14* (2006.01)
(52) U.S. Cl. ............... 340/572.7; 340/572.1; 340/539.12
(58) Field of Classification Search ............... 340/572.7, 340/10.42, 825.49, 539.13, 572.1, 539.1, 340/539.12
See application file for complete search history.

(56) References Cited

U.S. PATENT DOCUMENTS

| 4,773,029 A | * | 9/1988 | Claesson et al. ............... 702/167 |
| 4,905,512 A | * | 3/1990 | Hayashi .......................... 73/169 |
| 5,331,118 A | * | 7/1994 | Jensen ....................... 177/25.14 |
| 5,501,571 A | * | 3/1996 | Van Durrett et al. ......... 414/801 |
| 5,963,134 A | | 10/1999 | Bowers et al. |
| 5,991,041 A | * | 11/1999 | Woodworth ................... 356/602 |
| 6,330,973 B1 | | 12/2001 | Bridgelall et al. |
| 6,360,947 B1 | | 3/2002 | Knowles et al. |
| 6,457,642 B1 | * | 10/2002 | Good et al. ............... 235/462.01 |
| 6,497,361 B1 | | 12/2002 | Mason |
| 6,517,004 B2 | | 2/2003 | Good et al. |
| 6,554,189 B1 | | 4/2003 | Good et al. |
| 6,616,048 B2 | | 9/2003 | Good et al. |
| 6,693,539 B2 | | 2/2004 | Bowers et al. |
| 6,828,902 B2 | | 12/2004 | Casden |
| 6,851,610 B2 | | 2/2005 | Knowles et al. |
| 6,959,868 B2 | | 11/2005 | Tsikos et al. |
| 6,990,463 B2 | | 1/2006 | Walter et al. |
| 7,005,968 B1 | * | 2/2006 | Bridgelall ................... 340/10.42 |

(Continued)

FOREIGN PATENT DOCUMENTS

EP 0 456 704 B2 8/2001

OTHER PUBLICATIONS

Scientific publication entitled "Omni-Scan Tunnel" by Metrologic Instruments, Inc., Blackwood, NJ, Jan. 1997, pp. 1-18.

*Primary Examiner* — Daniel Previl
(74) *Attorney, Agent, or Firm* — Thomas J. Perkowski, Esq., PC

(57) ABSTRACT

A radio frequency identification ("RFID") method, computer-readable medium, apparatus, and system are provided. In one embodiment, the method acquires dimensions of an item. The dimensions and speed of the item are used to determine the item's location on a conveyor (i.e., to track the item on the conveyor). The location of the item is used to determine which switch RFID reader antenna in a plurality of RFID reader antennas is the most suitable RFID reader antenna to communicate with a transponder located on the item. In other embodiments, the apparatus, system, and computer-readable medium are also provided which perform similar features recited by the above method.

12 Claims, 7 Drawing Sheets

U.S. PATENT DOCUMENTS

| | | |
|---|---|---|
| 7,019,650 B2 | 3/2006 | Volpi et al. |
| 7,034,679 B2 | 4/2006 | Flynn |
| 7,036,729 B2 | 5/2006 | Chung |
| 7,066,388 B2 | 6/2006 | He |
| 7,084,769 B2 | 8/2006 | Bauer et al. |
| 7,114,656 B1 | 10/2006 | Garver |
| 7,124,950 B2 | 10/2006 | Blake et al. |
| 7,161,489 B2 | 1/2007 | Sullivan et al. |
| 7,168,525 B1 | 1/2007 | Jacobs |
| 7,215,976 B2 | 5/2007 | Brideglall |
| 7,253,717 B2 | 8/2007 | Armstrong et al. |
| 7,275,693 B2 | 10/2007 | Good et al. |
| 7,307,548 B2 | 12/2007 | Park et al. |
| 7,386,472 B1 | 6/2008 | Bogat |
| 7,432,811 B1 | 10/2008 | Kuzma et al. |
| 7,492,261 B2 | 2/2009 | Cambre et al. |
| 7,513,425 B2 | 4/2009 | Chung |
| 7,515,051 B2 | 4/2009 | Wagner et al. |
| 7,516,819 B2 | 4/2009 | Johnson et al. |
| 7,518,502 B2 | 4/2009 | Austin et al. |
| 7,539,465 B2 | 5/2009 | Quan |
| 7,554,451 B2 | 6/2009 | Carrender et al. |
| 7,584,893 B2 | 9/2009 | Tsikos et al. |
| 7,592,919 B2 | 9/2009 | Fischer et al. |
| 7,600,689 B2 | 10/2009 | Tsikos et al. |
| 7,602,293 B2 | 10/2009 | Taki et al. |
| 7,614,555 B2 | 11/2009 | Sullivan et al. |
| 7,616,120 B1 | 11/2009 | Humes et al. |
| 7,621,446 B2 | 11/2009 | Addison et al. |
| 7,626,488 B2 | 12/2009 | Armstrong et al. |
| 7,642,917 B2 | 1/2010 | Tran |
| 7,669,765 B2 | 3/2010 | Harper et al. |

* cited by examiner

RADIO FREQUENCY IDENTIFICATION ANTENNA SWITCHING IN A CONVEYOR SYSTEM

BACKGROUND OF THE INVENTION

1. Field of the Invention

Embodiments of the present invention generally relate to conveyance systems and more particularly, to switching to an antenna in accordance with a position of an item on a conveyor and/or dimensional information of the item.

2. Description of the Related Art

Movable conveyance systems (e.g., conveyor belts) are often utilized to efficiently move products. Often systems are utilized, with the conveyor systems, to monitor the movement of the products.

A radio frequency identification ("RFID") system typically employs at least two components, a "transponder" (also known as a "tag") that is attached to the physical item to be identified, and a "reader," which sends an electromagnetic signal to the transponder and then detects a response. Typically, the reader emits an RF signal, which is received by the transponder, after the transponder comes within an appropriate range. In response, the transponder sends its information via a modulated RF signal back to the reader. The reader detects this modulated signal, and can identify the transponder by decoding the modulated signal. After identifying the transponder, the reader can either store the decoded information or transmit the decoded signal to a computer.

As products move along the conveyor, an RFID antenna produces an RF field. However; the RF field may not be optimized for efficient communication with the transponder(s). Therefore, there is a great need in the art for an improved conveyance system, which avoids the shortcomings and drawbacks of prior art laser beam scanning apparatus and methodologies.

SUMMARY OF THE INVENTION

These and other deficiencies of the prior art are addressed by the present invention, which generally relates to scanning systems and more particularly, to switching to an antenna in accordance with a position of an item on a conveyor and/or dimensional information of the item. In one embodiment, a radio frequency identification ("RFID") method is provided. The method acquires dimensions of an item. The dimensions and speed of the item are used to determine the item's location on a conveyor (i.e., to track the item on the conveyor). The location of the item is used to determine which switch RFID reader antenna in a plurality of RFID reader antennas is the most suitable RFID reader antenna to communicate with a transponder located on the item. In other embodiments, an apparatus, system, and computer-readable medium are also provided which perform similar features recited by the above method.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION

In the following description, numerous specific details are set forth to provide a more thorough understanding of the invention. As will be apparent to those skilled in the art, however, various changes using different configurations may be made without departing from the scope of the invention. In other instances, well-known features have not been described in order to avoid obscuring the invention. Thus, the invention is not considered limited to the particular illustrative embodiments shown in the specification and all such alternate embodiments are intended to be included in the scope of this invention.

The invention may be used with various types of conveyor systems. For example, the invention may be utilized with conveyors, which incorporate symbol (e.g., bar code) scanning systems (e.g., omni-directional or non-omni-directional scanners); or by retrofitting conveyor systems, which do not have symbol scanning systems. Although the invention is described using holographic imagers (e.g., scanners) it is appreciated that other types of imaging systems may be used in accordance with the invention. Some exemplary imaging systems that may be used are, but not limited to, camera imaging systems, non-holographic scanning systems, and counter-top scanning systems. For illustrative purposes only, the invention is described with respect to an omni-directional scanner; and with respect to a conveyor system not having a scanner however, those depictions are not intended in any way to limit the scope of the invention.

Further, for illustrative purposes, the invention has been described with respect to an omni-directional scanner produced by Metrologic, Instruments, Inc. of Blackwood N.J. However, it is appreciated that the invention is not limited to the illustrative scanner disclosed herein.

This document incorporates by reference all of the material disclosed within commonly owned and assigned U.S. Pat. No. 6,971,580 issued Dec. 6, 2005 and entitled AUTOMATED METHOD OF AND SYSTEM FOR DIMENSIONING OBJECTS OVER A CONVEYOR BELT STRUCTURE BY APPLYING CONTOURING TRACING, VERTICE DETECTION, CORNER POINT DETECTION, AND CORNER POINT REDUCTION METHODS TO TWO-DIMENSIONAL RANGE DATA MAPS OF THE SPACE ABOVE THE CONVEYOR BELT CAPTURED BY AN AMPLITUDE MODULATED LASER SCANNING BEAM; and commonly owned and assigned U.S. Pat. No. 6,959,868 issued Nov. 1, 2005 and entitled TUNNEL-BASED METHOD OF AND SYSTEM FOR IDENTIFYING TRANSPORTED PACKAGES EMPLOYING THE TRANSMISSION OF PACKAGE DIMENSION DATA OVER A DATA COMMUNICATIONS NETWORK AND THE TRANSFORMATION OF PACKAGE DIMENSION DATA AT LINEAR IMAGING SUBSYSTEMS IN SAID TUNNEL-BASED SYSTEM SO AS TO ENABLE THE CONTROL OF AUTO ZOOM/FOCUS CAMERA MODULES THEREWITHIN DURING LINEAR IMAGING OPERATIONS, as if being set forth in its entirety herein.

Figure 1:
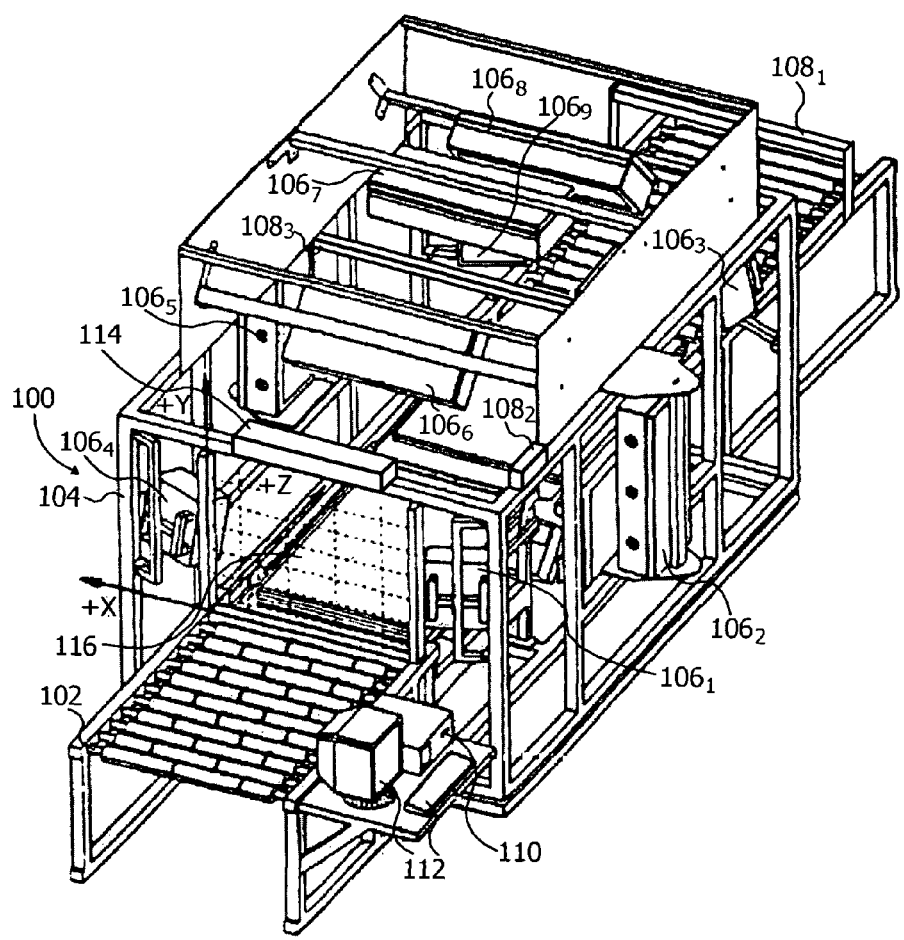
FIG. 1 depicts a perspective view of an exemplary conveyor system used in accordance with aspects of this disclosure.

FIG. 1 depicts a perspective view of an exemplary conveyor system 100 in accordance with an embodiment of the invention. The exemplary scanner system 100 includes a conveyor 102; a scanner support framework 104; holographic laser scanning subsystems $106_1$, $106_2$, $106_3$, $106_4$, $106_5$, and $106_6$ (collectively scanners 106); a graphical user interface 112 (illustratively depicted as a combination of a monitor and keyboard); a computer processing unit 110; an item-dimensioning module 114; and RFID antennas $108_1$, $108_2$, $108_3$ (collectively RFID antennas 108). Although FIG. 1 depicts the conveyor system 100 as having three RFID antennas it is appreciated that conveyor system 100 can include more or less RFID antennas.

The support frame 104 is positioned over a portion of the conveyor 102 to form a cavity 116. Items on the conveyor 102, which pass through the cavity 116 are interrogated and/or optically scanned. The volume formed by the cavity 116 is herein referred to as an "interrogation zone 116."

For illustrative purposes "X," "Y," and "Z" axes are also shown in FIG. 1. Illustratively, the "Y" axis is parallel to the longitudinal axis of the conveyor 102; the "X" axis is transverse to the longitudinal axis of the conveyor and substantially perpendicular to the "Y" axis; and the "Z" axis is substantially perpendicular to the "X" and "Y" axes. An item, when placed on the conveyor 102, moves along the conveyor 102, parallel to the "Y" axis, towards the interrogation zone 116.

Prior to the item's entrance into the interrogation zone 116, the item-dimensioning module 114 detects the item and gathers dimensional information (e.g., height, width, and length), which is used to track the item as it passes through the interrogation zone 116 along conveyor 102. The information gathered by the item-dimensioning module 114 is transmitted towards the computer-processing unit 110.

An exemplary item-dimensioning module 114 is made by Metrologic Instruments, Inc. of Blackwood, Blackwood N.J. under the trademark Qtrace™. For illustrative purposes, some aspects of Qtrace™ are described herein. Qtrace™ employs a laser doppler imager which uses two sets of amplitude modulated lasers, operating at separate wavelengths. However, the use of Qtrace™ to describe the invention is not intended in any way to limit the scope of the invention. It is appreciated that other item-dimensioning modules can be used in accordance with the invention.

It is also appreciated that in various embodiments of the invention, the item's dimensions may be transmitted to the computer-processing unit 110 (e.g., input via the graphical user interface 112) or stored in memory prior to an item being placed on conveyor 102.

The speed of the conveyor 102 is transmitted towards the computer-processing unit 110. For example, a tachometer (not shown) can regulate and/or monitor the speed of the conveyor 102. The computer processing unit 110 uses the item's dimensional information and speed of the conveyor 102 (i.e., the speed of the item) to determine the position of the item during the time that the item is on the conveyor 102.

The computer processing unit 110 has, stored in memory, the operating specifications and locations of each of the RFID antennas 108. Each of the RFID antennas 108 can be of the same type or comprising multiple types of antennas. For example, RFID antenna $108_1$ can be a loop antenna, RFID antenna $108_2$ can be a Hyedio Yagi antenna, and RFID antenna $108_3$ can be a circular antenna. Other exemplary antennas adaptable for use with the present disclosure are dipole antennas and patch antennas. In addition to determining the position of the item on the conveyor 102, the computer processing unit 110 determines which antenna 108 is the optimal RFID antenna 108 for communication with an RFID transponder (discussed in greater detail below). After a determination of the optimal RFID antenna 108, the computer processing unit 110 transmits an instruction to an antenna switch (discussed in greater detail below) to switch to the optimal RFID antenna 108.

Although the scanner system 100 is depicted as having six scanner subsystems 106 (scanners $106_1$-$106_6$) that depiction is for illustrative purposes only. The scanner subsystems 106 are strategically positioned on support frame 104 to scan items in the interrogation zone 116. For example, individual scanners can be positioned in the corners, top, and sides (and optionally the front and back) of the support frame 104 to scan the interrogation zone 116. Illustratively, the scanners 106 can be three dimensional triple-disc holographic scanners having multiple focal points.

In addition, the antenna 108 are tuned to the height of antenna in relation to the conveyor and interrogation path. This information is used to activate and optimize the RF field. The antenna configuration would be optimized for the size of the box and the location of the tag. The RF field is on all the time but in stand-by mode. One antenna 108 would be the default antenna (one used most often) unless the system indicated that another antenna would be better suited.

Figure 2:
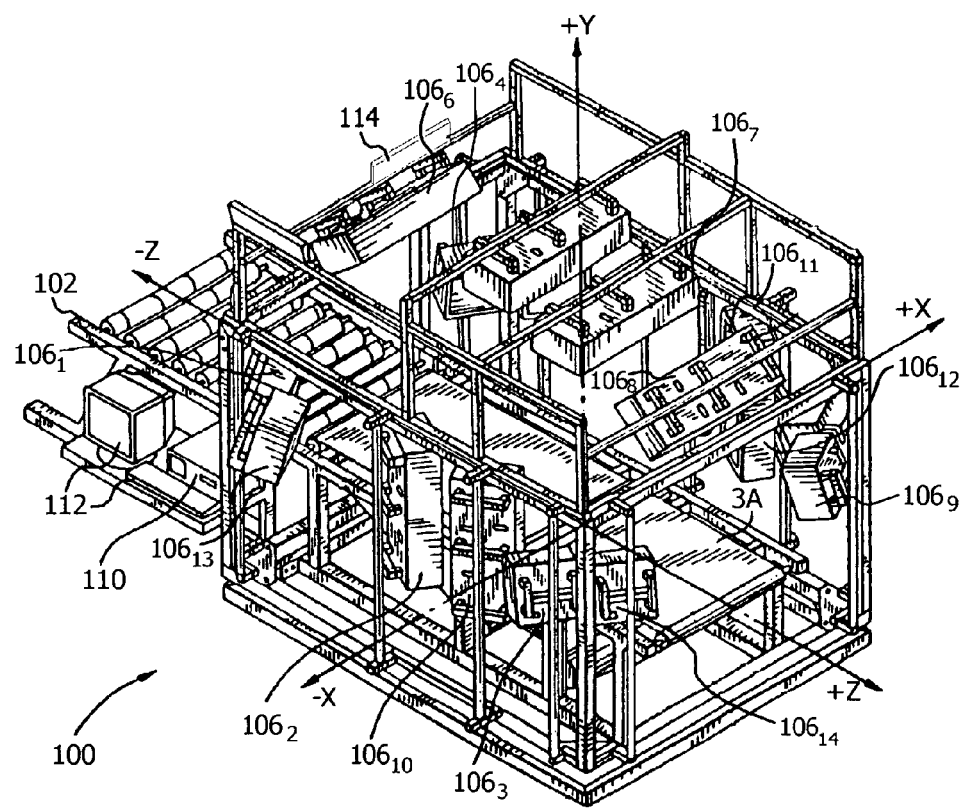
FIG. 2 depicts another perspective view of the exemplary conveyor system used in accordance with aspects of this disclosure.

FIG. 2 depicts another perspective view of the exemplary conveyor system 100 in accordance with aspects of this disclosure. Some of the elements depicted in FIG. 2 have already been described in FIG. 1. For brevity, those elements having already been described in FIG. 1 will not be described again in FIG. 2. In addition, to the previously described elements, FIG. 2 also depicts additional scanner subsystems $106_7$, $106_8$, $106_9$, $106_{10}$, $106_{11}$, $106_{12}$, $106_{13}$, and $106_{14}$ (scanners $106_1$-$106_{14}$ are collectively known as scanners 106). The inclusion of the sixteen scanner subsystems 106 in conveyor system 100 is optional. In various embodiments, the conveyor system 100 utilizes an item-dimensioning module 114, a RFID transponder/reader pair, and a plurality of reader antennas.

Figure 3:
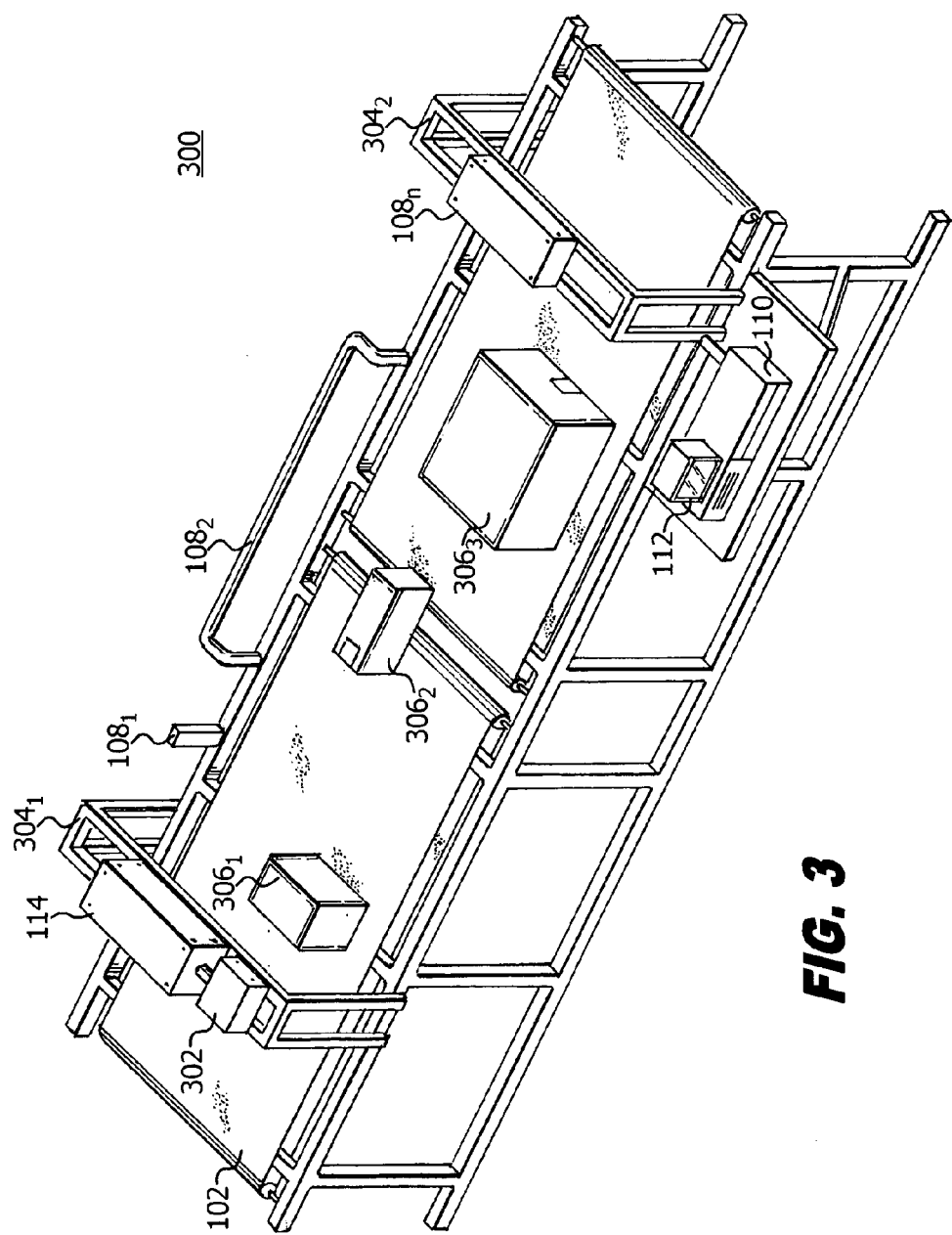
FIG. 3 depicts a perspective view of another exemplary conveyor system used in accordance with aspects of this disclosure.

FIG. 3 depicts a perspective view of another exemplary conveyor system 300 used in accordance with aspects of this disclosure. The conveyor system 300 includes a conveyor 102; supports $304_1$ and $304_2$ (collectively supports 304); RFID reader antennas $108_1$, $108_2$, ... $108_n$ (collectively antennas 108); item-dimensioning module 114; item detection module 302; GUI 112; and computer processing unit 110.

The embodiments of the invention may be incorporated into various types of conveyors. For example, conveyor 102 can be retrofitted to include aspects of the invention. Specifically, supports 304 are mounted above conveyor 102. Support $304_1$ has mounted thereon an item-dimensioning module 114 and an item sensing module 302. When an item(s) $306_1$, $306_2$ and/or $306_3$ (collectively item 306) is placed on conveyor 102, the item 306 is detected by the item detection module 302. The operation of the item-dimensioning module 114, GUI 112, computer processing unit 110 and RFID reader antennas 108 have already been described in FIGS. 1 and 2. For brevity, an explanation of those elements already described is not repeated.

Figure 4:
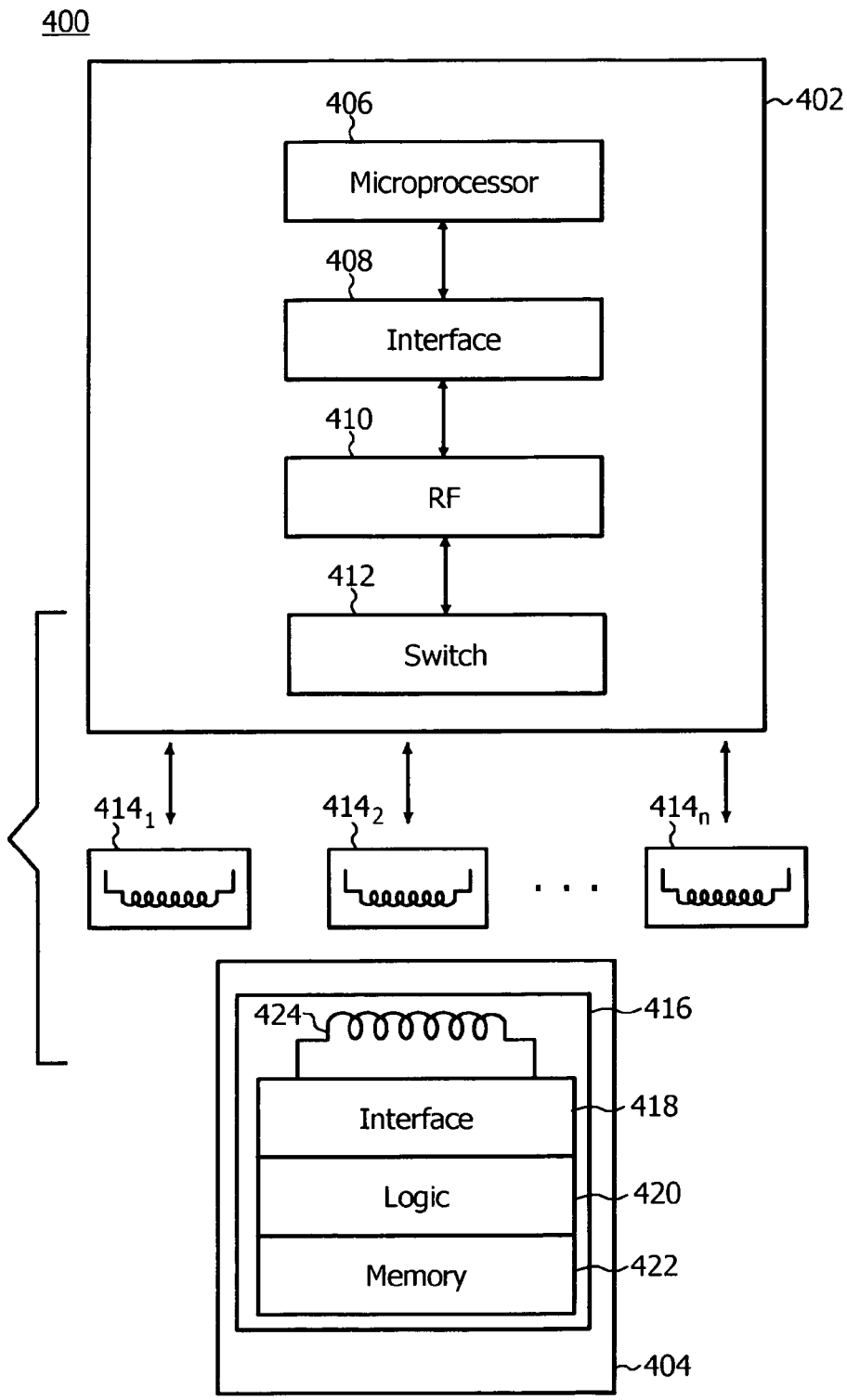
FIG. 4 depicts a block diagram of an exemplary reader/transponder pair in accordance with aspects of this disclosure.

FIG. 4 is a block diagram of an exemplary reader/transponder pair 400 utilized in accordance with an embodiment of the invention. Generally, the reader/transponder pair 400 includes a reader 402 and a transponder 404 (also known as a "tag").

The reader 402 includes a microprocessor 406; an interface 408; a radio frequency module 410 (and modulator (not shown)); a multiplexer 412; and reader antenna $414_1$, reader antenna $414_2$, and reader antenna $414_n$ (collectively reader antenna array 414). In various embodiments, a portion (i.e., the microprocessor 406, the interface 408, the radio frequency module 410, and/or the multiplexer 412) of the reader 402 can be inside the computer processing unit 110 while the reader antenna array 414 is outside of the computer processing unit 110.

The microprocessor 406 processes information regarding the dimensions of the item and the speed of conveyor 102 to track the item (e.g., as it passes through the interrogation zone 116). Thereafter, the microprocessor 406 determines which antenna in the reader antenna array 414 for transmission and/or reception of radio frequency signals ("RF signals") to and from the transponder 404. The microprocessor 406 transmits a switching signal to the multiplexer 412 so that the multiplexer 412 will switch to an antenna in the reader antenna array 414.

The microprocessor 406 transmits information towards the interface 408 in accordance with the determination (e.g., which RFID reader antenna in the antenna array 414 to switch to).

The interface 408 translates information between the microprocessor 406 and the RF modulator 410. The RF modulator 410 transmits an RF signal to an appropriate antenna, through the multiplexer 412, in the reader antenna array 414.

Each reader antenna in the reader antenna array 414 can have the same frequency range; or operate a different frequency range than other reader antennas in the reader antenna array 414. Further, any antenna in the reader antenna array can be configured and designed to operate in the Low Frequency ("LF"), High Frequency ("HF"), Ultra-High Frequency ("UHF"), or Microwave Frequency. In addition, it is also appreciated that the reader antenna array 414 can utilize the same type of antennas or different types of antennas. Although FIG. 4 depicts the reader antenna array 414 as having three reader antennas that depiction is for illustrative purposes only. It is appreciated that more or less reader antennas can be included in the reader antenna array 414.

Various types of transponders 404 can be used in accordance with the invention (i.e., passive, semi-passive, or active). For illustrative purposes only, transponder 404 is described as a passive transponder. The transponder 404 includes a transponder antenna 424, a transponder interface 418, transponder logic circuitry 420, and memory 422.

Figure 5:
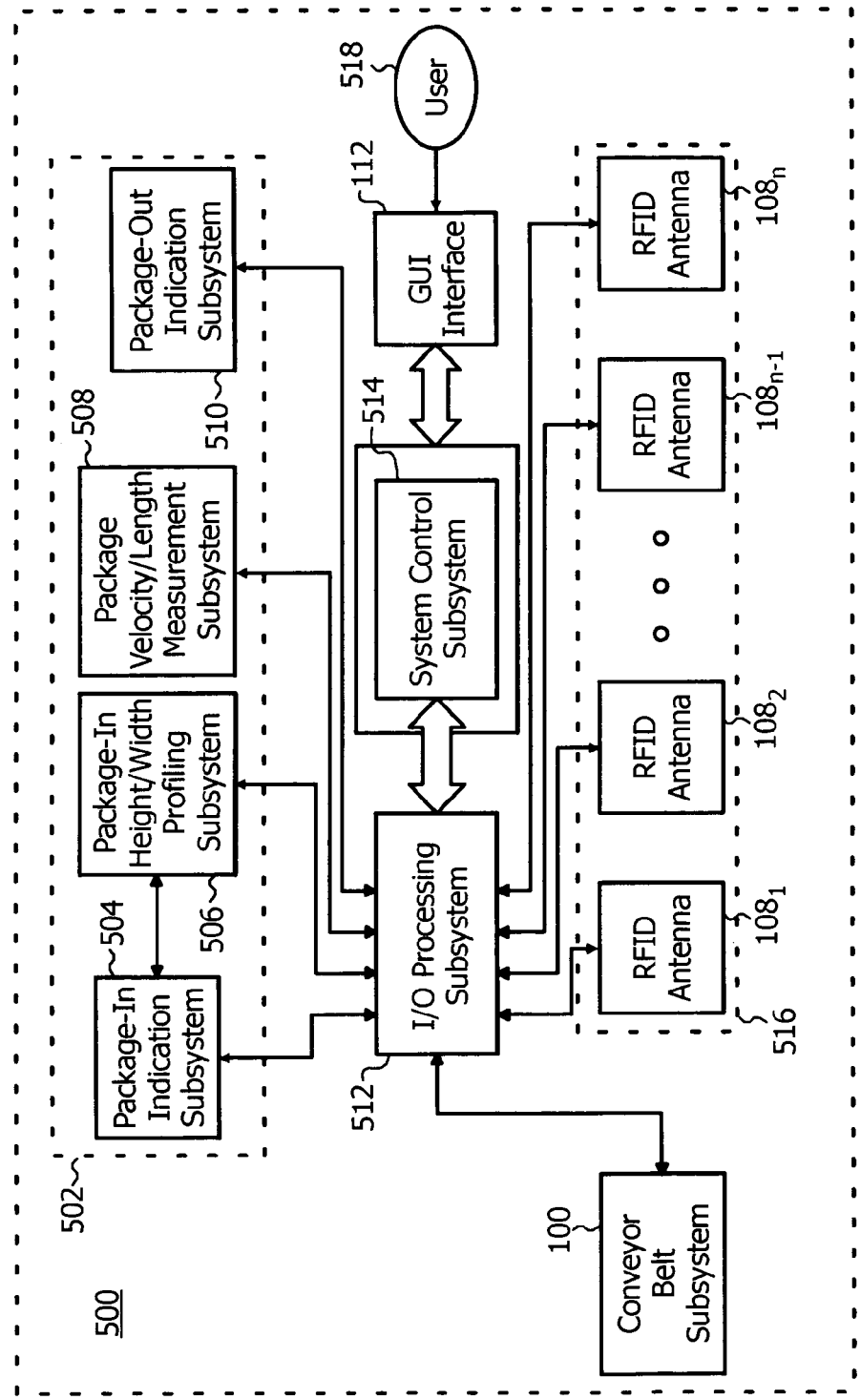
FIG. 5 depicts a high level block diagram of an exemplary system for performing aspects of this disclosure.

FIG. 5 is a high level block diagram of an exemplary system 500 for performing aspects of this disclosure. The system 500 includes an item movement subsystem 502, a package out-of-tunnel indication subsystem 510, an I/O processing subsystem 512, an RFID antenna subsystem 516, a conveyor subsystem 100, a system control subsystem 514, a graphical user interface ("GUI") subsystem 112, and a user 518 (optional).

The I/O processing subsystem 512 transmits information to and from the other subsystems depicted in FIG. 5. Communication between the I/O subsystem and the GUI 112 is provided by the system control subsystem 514. The system control subsystem 514 controls the other subsystems depicted in FIG. 5. The user 518 is able to view the status of the subsystem and to enter instructions via the GUI 112.

In one embodiment, the item movement subsystem 502 includes a package velocity/length measurement subsystem 508, a package height/width profiling subsystem 506, and a package in-tunnel indication subsystem 504. When an item is placed on the moving conveyor 102 the package velocity/length measurement subsystem 508 measures the velocity and length of the item on the conveyor 102; the package height/width profiling subsystem 506 measures the height and width of the item; and the package in-tunnel indication subsystem 504 provides information regarding whether the item is in the tunnel. When the item has passed through and outside the tunnel the package out-of-tunnel subsystem 510 transmits information towards the I/O processing subsystem 512.

The I/O subsystem 512 transmits information from the item movement subsystem 502 to the system control subsystem 514 for processing and, when necessary receives information from the system control subsystem 514 for transmission towards the RFID antenna subsystem 516.

In various embodiments, the reader 402 is incorporated into the system control subsystem 514. In yet other embodiments, the reader 402 is a "standalone" unit coupled to the system control subsystem 514 and RFID antenna subsystem 516.

The RFID antenna subsystem 516 illustratively includes RFID antennas $108_1$, $108_2$, $108_{n-1}$, and 108, (collectively RFID antennas 108). It is appreciated that the RFID antenna subsystem 516 includes the same type of RFID antennas or alternatively different types of antennas.

Figure 6:
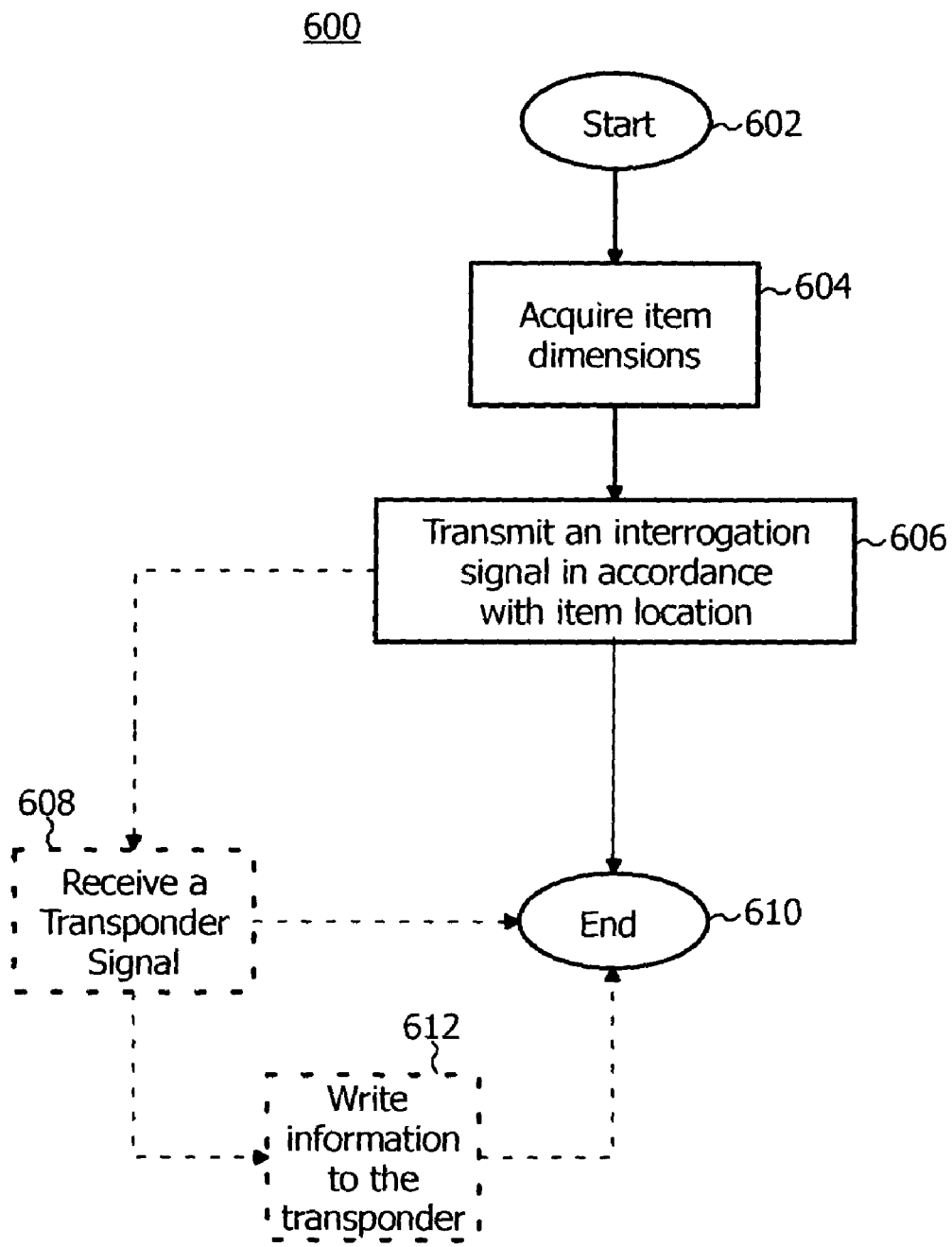
FIG. 6 depicts an embodiment of a method in accordance with aspects of the disclosure.

FIG. 6 depicts an embodiment of an antenna switching method 600 in accordance with aspects of the disclosure. When a sensor detects the presence of an item on a conveyor (e.g., conveyor 102), the method 600 begins at step 602. In various embodiments, the sensor is a stand-alone module (e.g., a motion sensor) and in yet other embodiments, the sensor is incorporated into an item dimensional module (e.g., item-dimensioning module 114). After detecting the presence of the item, the method 600 proceeds to step 604.

At step 604, the method 600 acquires the dimensions (e.g., height, width, and length) of the item (e.g., a package). The dimensions of the item can be provided by a user or gathered by an item-dimensioning module (e.g., the Qtrace™ module). The dimensional information of the item is stored and processed by a processing unit (e.g., computer processing unit 110). In various embodiments, when the dimensional information is acquired from an item-dimensioning module, the distance of the item-dimensioning module to an item-less conveyor is calibrated.

The processing unit uses the dimensional information of the item and the speed of the item on the conveyor 102 (i.e., the speed of the conveyor) to calculate the position of the item while the item is on the conveyor. The item may be tracked on the conveyor 102 at any time after the initial position of the item on the conveyor is determined (i.e., by the item-dimensioning module).

Strategically positioned near the conveyor is a plurality of RFID reader antennas 108. The processing unit also has stored in memory the characteristics (and positions with respect to the conveyor) of each of the RFID reader antennas (e.g., interrogation range, operating frequency range, and power consumption). The processing unit uses the dimensional information of the conveyor, size of the item, and position of the item on the conveyor; and the characteristics and positions of the RFID reader antennas to determine which antenna is the best antenna to communicate with a transponder located on the item. After the processing unit determines the best RFID reader antenna to communicate with the transponder, the method 600 proceeds to step 606.

At step 606, the processing unit switches to the best RFID reader antenna and transmits an interrogation signal to the transponder. In some instances the current RFID reader antenna (or default RFID reader antenna) is the best RFID reader antenna to communicate with the transponder. In these instances there is no need for the processing unit to switch to another RFID reader antenna. As the item moves along the conveyor 102 the reader antenna used to communicate RF information with the transponder may change to a different reader antenna. For example, when the item initially enters the interrogation zone 116, reader antenna $108_1$ may have been selected as the most suitable reader antenna in the reader antenna array 108 to communicate with the transponder. As the item is transported along the conveyor 102 a different reader antenna in the reader antenna array 108 may be better suited to communicate RF with the transponder. If the microprocessor 406 determines that another reader antenna in the reader antenna array 108 then the microprocessor 406 may transmit instructions to the multiplexer 412 to switch from reader antenna $108_1$ to another reader antenna (e.g., reader antenna $108_2$).

There are instances when there is no transponder located on the item. In these instances the method 600, after transmission of the interrogation signal, proceeds to and ends and step 610.

Some embodiments of the method 600 include optional steps 608 and 612. For example, after transmission of the interrogation signal (i.e., after step 606), the method 600 optionally proceeds to step 608. At step 608, the RFID reader receives a signal from the transponder. The signal from the transponder contains information stored in the transponder. After reception of the transponder signal the method 600, in various embodiments, proceeds to and ends at step 610.

In yet other embodiments, the method 600 proceeds to step 612 after step 608. For example, there are instances when transponders are used that allow an RFID reader to write information to the transponder. At step 612 the reader transmits information to the transponder for storage on the transponder's memory. After step 612, the method 600 proceeds to and ends at step 610.

Figure 7:
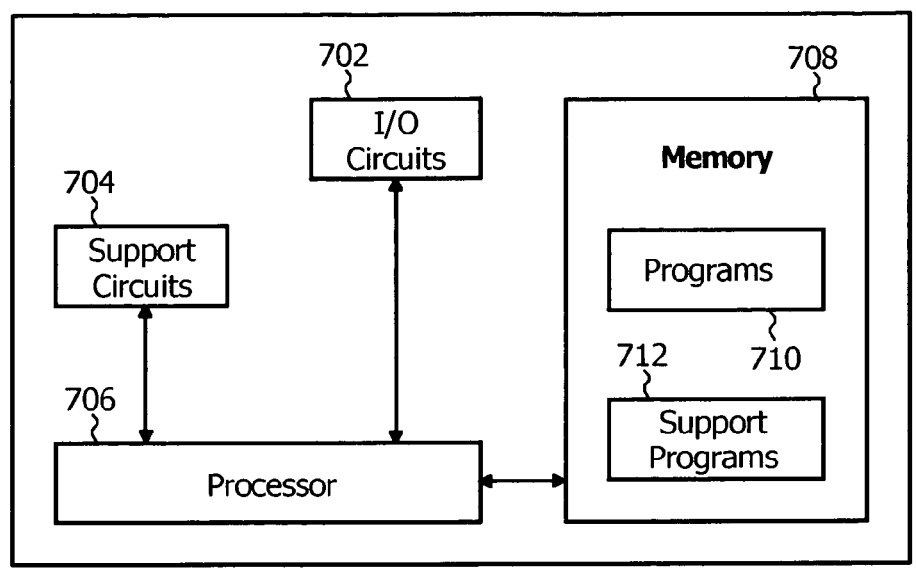
FIG. 7 depicts a high level block diagram of a computer architecture for performing aspects of this disclosure.

FIG. 7 depicts a high level block diagram of an embodiment of a controller 700, as part of electronic circuitry, suitable for use in providing a scan mode indicator (e.g., an audible signal) in accordance with a selected operation mode. The controller 700 of FIG. 7 comprises a processor 706 as well as a memory 708 for storing control programs 710 (e.g., antenna switching programs (e.g., for performing the method 600)), support programs 712, and the like. Although FIG. 7 is depicted as including an antenna switching system it is appreciated that controller 700 can include, in alternative embodiments, instructions for performing method 600. The processor 706 cooperates with conventional support circuitry 704 such as power supplies, clock circuits, cache memory and the like as well as circuits that assist in executing the software routines stored in the memory 708. As such, it is contemplated that some of the process steps discussed herein as software processes may be implemented within hardware, for example, as circuitry that cooperates with the processor 706 to perform various steps. The controller 700 also contains input-output circuitry 702 that forms an interface between the various functional elements communicating with the controller 700. For example, in various embodiments, the controller 700 also communicates with a data transmission subsystem for transmission of information to remote computer systems.

Although the controller 700 of FIG. 7 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

Although various embodiments that incorporate the teachings of the present invention have been shown and described in detail herein, those skilled in the art can readily devise many other varied embodiments that still incorporate these teachings.

We claim:

1. A method of switching optimal radio frequency identification (RFID) reader antennas in a conveyor system to communicate with an RFID tag containing item identification information on each item being transported on a conveyor through said conveyor system, said method comprising:
    (a) supporting a plurality of RFID reader antennas over said conveyor, and operably connecting said RFID reader antennas to an antenna switch controlled by a programmed central processing unit (CPU) having associated memory,
    wherein each said RFID reader antenna has a stand-by mode and an interrogation-mode,
    wherein each said RFID reader antenna is arranged to communicate with each said RFID tag on each said item, and
    wherein each said RFID reader antenna has at least one of a different interrogation area and operating frequency;
    (b) storing in said memory, operating specifications and locations of each of said plurality of RFID reader antennas supported over said conveyor;
    (c) operating one said RFID reader antennas in said interrogation-mode, while the other of said plurality of RFID reader antennas are operated in said stand-by mode; and
    (d) as each said item is being transported along said conveyor through said conveyor system, each said item has dimensions, a position and a speed, and the following control process is carried out:
        (i) using an item dimensioning module to automatically acquire dimensions of said item being transported along said conveyor through said system conveyor system,
        (ii) said programmed CPU automatically determining the position of said item on said conveyor, from said dimensions of the item and the speed of said item being transported along said conveyor,
        (iii) said programmed CPU automatically determining an optimal RFID reader antenna in said plurality of RFID reader antennas, for communicating with the item being transported along said conveyor through said conveyor system, wherein said optimal RFID reader antenna is optimized for the size of the item and location of said RFID tag attached thereto, and
        (iv) said programmed CPU automatically sending an instruction to said antenna switch causing said optimal RFID reader antenna to operate in said interrogation-mode.

2. The method of claim 1, wherein said item dimensioning module comprises a plurality of sensors.

3. The method of claim 1, which further comprises an item detection module.

4. The method of claim 1, wherein said plurality of RFID reader antennas is strategically positioned with said conveyor.

5. The method of claim 1, wherein said plurality of RDIF reader antennas are selected from the group consisting of a loop antenna, a Yagi antenna, a circular antenna, dipole antennas, and patch antennas.

6. The method of claim 1, wherein each said RFID reader antenna is tuned to the height of said RFID reader antenna in relation to said conveyor and said interrogation area.

7. A conveyor system employing a plurality of optimally switched radio frequency identification (RFID) reader antennas for optimal communication with an RFID tag containing item identification information on each item being transported on a conveyor through said conveyor system, said conveyor system comprising:
   a plurality of RFID reader antennas supported over said conveyor, and operably connecting to an antenna switch controlled by a programmed central processing unit (CPU) having associated memory;
   wherein each said RFID reader antenna has a stand-by mode and an interrogation-mode;
   wherein each said RFID reader antenna is arranged to communicate with each said RFID tag on each said item;
   wherein each said RFID reader antenna has at least one of a different interrogation area and operating frequency; and
   wherein said memory stores operating specifications and locations of each of said plurality of RFID reader antennas supported over said conveyor; and
   an item dimensioning module for dimensioning each said item transported on said conveyor, and interfaced with said programmed CPU;
   wherein one of said RFID reader antennas is operated in said interrogation-mode, while the other of said plurality of RFID reader antennas are operated in said stand-by mode; and
   wherein, as each said item is being transported along said conveyor through said conveyor system, each said item has dimensions, a position and a speed, and the following control process is carried out:
   (i) said item dimensioning module automatically acquires dimensions of said item being transported along said conveyor through said system conveyor system,
   (ii) said programmed CPU automatically determines the position of said item on said conveyor, from said dimensions of the item and the speed of said item being transported along said conveyor,
   (iii) said programmed CPU automatically determines the optimal RFID reader antenna in said plurality of RFID reader antennas, for communicating with the item being transported along said conveyor through said conveyor system, wherein said optimal RFID reader antenna is optimized for the size of the item and location of said RFID tag attached thereto, and
   (iv) said programmed CPU automatically sends an instruction to said antenna switch causing said optimal RFID reader antenna to operate in said interrogation-mode.

8. The system of claim 7, wherein said item dimensioning module comprises a plurality of sensors.

9. The system of claim 7, which further comprises an item detection module.

10. The system of claim 7, wherein said plurality of RFID reader antennas is strategically positioned with said conveyor.

11. The system of claim 7, wherein each said RFID reader antenna is tuned to the height of said RFID reader antenna in relation to said conveyor and said interrogation area.

12. The system of claim 7, wherein said plurality of RDIF reader antennas are selected from the group consisting of a loop antenna, a Yagi antenna, a circular antenna, a dipole antenna, and a patch antenna.

* * * * *